Jan. 16, 1923.  1,442,556
D. E. BHARUCHA.
PROPELLING ATTACHMENT FOR BICYCLES.
FILED APR. 18, 1921.
2 SHEETS-SHEET 1
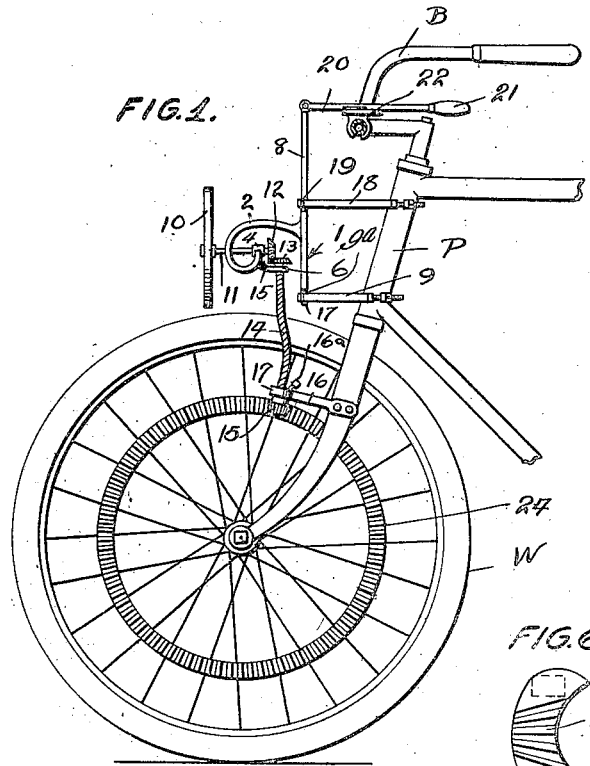
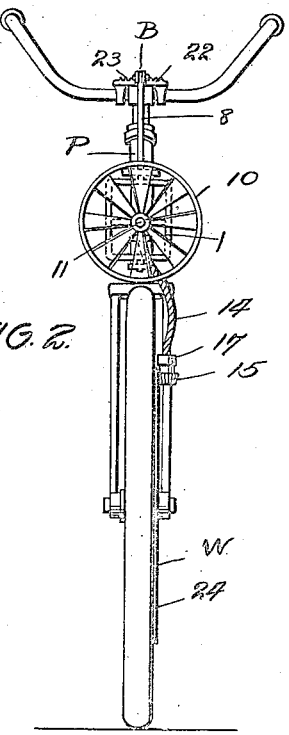
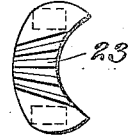
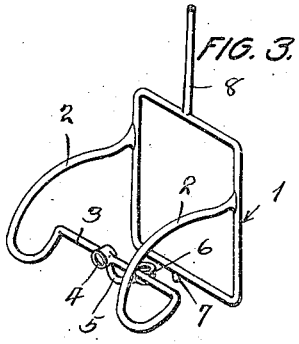
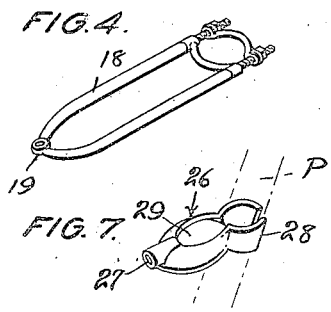
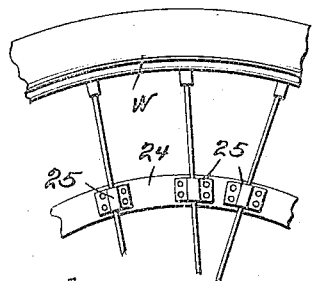
Dosabhoy E. Bharucha
INVENTOR.
BY
Richard B. Owen,
ATTORNEY.

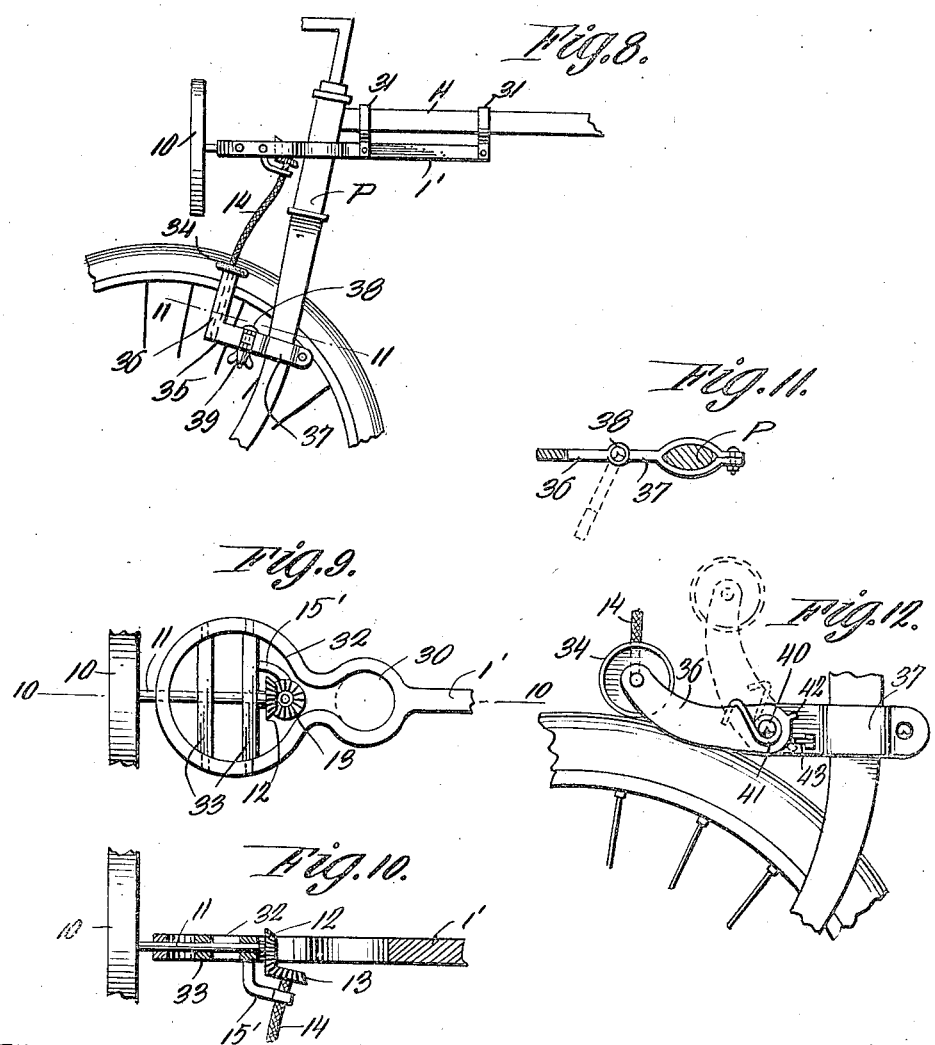

Patented Jan. 16, 1923.

1,442,556

UNITED STATES PATENT OFFICE.

DOSABHOY E. BHARUCHA, OF BOMBAY, INDIA.

PROPELLING ATTACHMENT FOR BICYCLES.

Application filed April 18, 1921. Serial No. 462,251.

*To all whom it may concern:*

Be it known that I, DOSABHOY E. BHARUCHA, a subject of the King of Great Britain, residing at Bombay, India, have invented certain new and useful Improvements in Propelling Attachments for Bicycles, of which the following is a specification.

This invention relates to bicycles and similar vehicles and more particularly to auxiliary propelling means therefor.

The object of the invention is to provide simple and efficient wind actuated propelling mechanism for vehicles whereby the vehicle may be propelled at a maximum speed with a minimum application of power.

With the foregoing and other objects in view, which will appear as the description proceeds the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Fig. 1 represents a side elevation of the front end of the bicycle with this improved attachment shown applied.

Fig. 2 is a front elevation thereof.

Fig. 3 is a detail perspective view of the fan supporting frame.

Fig. 4 is a similar view of one of the frame-supporting brackets.

Fig. 5 is a detail side elevation of the front wheel of a bicycle showing a portion of one element of the invention applied.

Fig. 6 is a detail plan view of the rack which is carried by the bicycle handle bar; and Fig. 7 is a detail perspective view of a clamp for connecting the fan spindle to the bicycle frame.

Figure 8 is a side elevation of a modified form of the invention applied to the front end of a bicycle.

Figure 9 is an enlarged fragmentary top plan of the modified fan supporting frame.

Figure 10 is a longitudinal section through the same.

Figure 11 is a detailed section taken on the line 11—11 of Figure 8 illustrating the improved roller supporting bracket, and Figure 12 is a side elevation of a further modified form of the invention applied to the front end of a bicycle.

In the embodiment illustrated, the attachment constituting this invention comprises a fan supporting frame 1 here shown rectangular although obviously any other desired configuration may be employed. This frame 1 has projecting forwardly from the side bars thereof two downwardly curved arms 2 which are connected at their lower ends by a cross bar 3 having a bearing 4 arranged midway its length for a purpose presently to be described. A downwardly and inwardly curved bracket 5 is carried by the bar 3 and has a vertically opening bearing 6 at its free end for a purpose presently to be described.

Depending from the lower cross bar of frame 1 is a stud 7 while a rod 8 projects upwardly from the upper cross bar of said frame.

Brackets 9 and 18 which are similarly constructed, being preferably in the form shown in Fig. 4, are clamped to the steering post P of the bicycle in vertically spaced relation.

These brackes 9 and 18 project forwardly from the steering post P and have at their front ends vertically aligned bearings 9ª and 19 which are designed to receive respectively the stud 7 and rod 8 of the frame 1 and permit the rotating of said frame. The rod 8 extends upwardly and has pivoted to its free end a bar 20 having a hand grip 21 at its terminal. This bar 20 is adapted to move vertically and to be engaged with grooves formed between ribs 23 of a rack bar 22 secured to the handle-bars of the bicycle.

A fan or wind wheel 10 is carried by a spindle 11 which projects through the bearing 4 of the frame 1 and has fixed to its inner free end a bevel gear 12. This gear 12 meshes with a similar gear 13 carried by a flexible shaft 14 mounted in the bearing 6.

The flexible shaft 14 carries at its lower end a beveled gear 15 which meshes with a ring gear 24 carried by the spokes of the front wheel of the bicycle. This ring gear 24 may be secured to the wheel by any suitable means, it being here shown held engaged with the spokes of the wheel by clamps 25 on the inner face of the gear 24 as is shown clearly in Figure 5.

A bracket 16 is fixed to the steering post P and carries at its front end a bearing 17 through which the shaft 14 extends.

A grease cup 16ª is preferably provided for this bearing as is shown clearly in Figure 1.

In Figure 7 a modified form of bracket 26 is shown which can be utilized in lieu of the frame 1 and associate parts, and the bracket has curved fingers 28 for engagement in the steering post P. These fingers are preferably welded to the post although they may be otherwise secured. A bearing 27 for the spindle projects longitudinally from the front end of the bracket 26, and said bracket has an opening 29 extending vertically at the inner end of said bearing for the reception of the flexible shaft 14.

From the above description it will be obvious that when there is sufficient wind blowing to actuate the wind wheel 10 the rotation thereof will materially aid the rider in the propulsion of the vehicle in that the rotation of said wheel transmits motion through the medium of shafts 11 and 14 and the bevel gears 12 and 13 to the gear 15, which in turn drives the crown gear 24 and thus actuates the bicycle wheel.

High rates of speed may be obtained when a good wind is blowing and obviously the gearing may be changed so that practically any rate of speed could be obtained. While reference is made to blowing of the wind it is, of course, understood that when the bicycle is moving the air would strike the wheel 10 with the same force as if the vehicle were standing still and the wind blowing at the rate of which the vehicle is moving. For instance, if the rider is riding at the rate of, say ten miles per hour, he would have an air current at the same rate to move the wind wheel.

By mounting the frame 1 to rotate in the brackets 9 and 18 the wheel 10 carried by the said frame may be shifted laterally to vary the position according to the direction in which the wind is blowing, and when so shifted it may be locked in adjusted position by engaging the bar 20 with one of the grooves in the rack bar 22.

In the form of invention illustrated in Figures 8, 9, 10, 11 and 12, the wind wheel supporting frame 1' consists of an elongated member having a vertical opening formed therethrough between its ends whereby the steering post may extend therethrough. The rear end of the frame extends rearwardly along the horizontal bar H of the bicycle a substantial distance and is secured thereto by means of clamps 31. The forward end of the frame 1' is enlarged and provided with a vertical opening 32 across which extends a pair of bearing members 33 through which a fan wheel spindle 11 is journaled. This spindle also projects through an opening provided in the forward end of the support and the forward end thereof is equipped with the fan wheel 10. The inner end of the spindle is provided with a bevel gear 12 adapted for meshing engagement with a similar horizontal gear 13 supported by a depending arm 15' of the support 1'. The bevel gear 13 drives a flexible shaft which in turn actuates a roller 34 mounted upon a bracket 35 in a manner to engage the side of the bicycle tire as in Figure 8 or the upper surface thereof as shown in Figure 12.

The bracket in both instances consists of a pair of sections 36 and 37 hingedly connected together, the section 36 forming the mounting for the friction roller, while the coacting section 37 is clamped to the front fork of the bicycle. In the bracket shown in Figures 8 and 11, the two sections are hinged by a vertical hinge pin 38, one end of which is provided with an enlarged head, while the opposite end of the pin is threaded for engagement of a thumb nut 39 thereby providing means for retaining the friction roller in engagement with or disengaged from the wheel tire. It will be understood that by tightening the thumb nut 39, friction between the two hinged sections is caused sufficiently to retain the roller carrying section 36 in the desired position.

In the form of bracket illustrated in Figure 12, the two sections are hinged together by a horizontal hinge 40 about which is coiled a spring 41, opposite ends of which are associated with the two sections normally urge the section 36 into such position that the roller 34 carried thereby engages the tire and the wheel. The roller carrying section 36 at its ends adjacent the hinge pin is provided with a rearwardly extending lug 42 extended for cooperation with a yieldable member 43 secured to the side of the coacting section in a manner whereby when the roller carrying section 36 is moved vertically, the lug 42 carried thereby engages the yieldable member and flexes the same sufficiently to permit the lug 42 to be retained thereunder. This engagement of the lug 42 and yieldable member 43 retains the hinge section 36 in an inoperative position; when it is desired to engage the roller 34, downward pressure is exerted upon the roller carrying section to disengage the lug 42 from the yieldable member.

From the foregoing description, it will be apparent that the operation of the modified form of the invention is practically the same as the preceding form, with the exception that the bicycle wheel is driven by frictional engagement with the roller 34 with the tire of the wheel.

The foregoing description and the drawings have reference to what may be considered the preferred or approved form of my invention. It is to be understood that I may make such changes in construction and arrangement of parts, materials, dimensions, etc., as may prove expedient and fall within the scope of the appended claims.

Having thus fully described my invention, what I claim as new is:—

1. The combination with a bicycle including a frame, a front steering fork carried by the frame, a front steering wheel rotatably carried by the fork and a drive wheel carried by the frame, of a supporting frame secured to the bicycle frame, a wind actuated propeller rotatably carried by the supporting frame, a drive wheel carried by the fork and operatively connected with the front steering wheel, and a flexible drive shaft connected directly to the drive wheel and operatively connected with the wind propeller, whereby movement of the drive wheel with the steering fork is permitted in relation to the supporting frame.

2. The combination with a velocipede, of a wind actuated propelling wheel mounted on the velocipede, a wheel actuating roller abutting the vehicle wheel for driving the same, a bracket supporting the roller and including a pair of hinged sections, and means carried by the bracket for retaining said rollers in or out of contact with the velocipede wheel.

In testimony whereof I affix my signature in presence of two witnesses.

DOSABHOY E. BHARUCHA.

Witnesses:
A. R. RAMASWAMY IYER,
LALLA DOOLAB.